United States Patent
Lundgren

(10) Patent No.: US 8,154,611 B2
(45) Date of Patent: Apr. 10, 2012

(54) METHODS AND SYSTEMS FOR IMPROVING RESOLUTION OF A DIGITALLY STABILIZED IMAGE

(75) Inventor: Mark A. Lundgren, Fullerton, CA (US)

(73) Assignee: The Boeing Company, Chicago, IL (US)

(*) Notice: Subject to any disclaimer, the term of this patent is extended or adjusted under 35 U.S.C. 154(b) by 513 days.

(21) Appl. No.: 12/174,931

(22) Filed: Jul. 17, 2008

(65) Prior Publication Data

US 2010/0014769 A1 Jan. 21, 2010

(51) Int. Cl.
*H04N 5/225* (2006.01)

(52) U.S. Cl. .................... 348/219.1; 348/208.13

(58) Field of Classification Search .......... None
See application file for complete search history.

(56) References Cited

U.S. PATENT DOCUMENTS

| | | | | |
|---|---|---|---|---|
| 4,652,928 A * | 3/1987 | Endo et al. | ............. | 348/219.1 |
| 5,060,074 A * | 10/1991 | Kinugasa et al. | ......... | 348/208.6 |
| 5,561,460 A * | 10/1996 | Katoh et al. | ............. | 348/219.1 |
| 5,748,232 A * | 5/1998 | Konuma | ............. | 348/219.1 |
| 5,889,553 A * | 3/1999 | Kino et al. | ............. | 348/218.1 |
| 6,236,430 B1 * | 5/2001 | Suzuki et al. | ............. | 348/219.1 |
| 6,570,613 B1 * | 5/2003 | Howell | ............. | 348/219.1 |
| 6,639,625 B1 * | 10/2003 | Ishida et al. | ............. | 348/218.1 |
| 6,714,240 B1 * | 3/2004 | Caswell | ............. | 348/241 |
| 6,734,903 B1 * | 5/2004 | Takeda et al. | ............. | 348/219.1 |
| 7,248,751 B2 | 7/2007 | Schuler et al. | | |
| 7,365,326 B2 | 4/2008 | Wood | | |
| 2002/0186312 A1 * | 12/2002 | Stark | ............. | 348/302 |
| 2004/0169735 A1 * | 9/2004 | Andersen | ............. | 348/219.1 |
| 2005/0286887 A1 * | 12/2005 | Uenaka et al. | ............. | 396/322 |
| 2007/0096011 A1 * | 5/2007 | Sato et al. | ............. | 250/208.1 |
| 2007/0120214 A1 * | 5/2007 | Cole | ............. | 257/461 |
| 2007/0279498 A1 * | 12/2007 | Nonaka | ............. | 348/220.1 |

OTHER PUBLICATIONS

Schuler, Jonathon M. et al., Increasing Spatial Resolution Through Temporal Super-Sampling of Digital Video, Optical Engineering, vol. 38 No. 5, May 1999, pp. 801-805.

* cited by examiner

*Primary Examiner* — Lin Ye
*Assistant Examiner* — Dennis Hogue
(74) *Attorney, Agent, or Firm* — Armstrong Teasdale LLP

(57) ABSTRACT

A method for increasing resolution of a focal plane array having a plurality of pixels dispersed across a total pixel area is described. The method includes providing an active pixel area for the focal plane array that is less than the total pixel area, acquiring image data utilizing the reduced active pixel area, and storing the image data in a portion of a memory, the memory having a capacity corresponding to the total pixel area of the focal plane array.

18 Claims, 5 Drawing Sheets

METHODS AND SYSTEMS FOR IMPROVING RESOLUTION OF A DIGITALLY STABILIZED IMAGE

BACKGROUND OF THE DISCLOSURE

The field of the disclosure relates generally to resolution of digital images, and more specifically, to methods and systems for improving resolution of a digitally stabilized image.

When collecting images of objects, such as a target, the sharpness of the picture is limited by one or more of the quality of the optics, pixel number, pixel size, and how densely the pixels are packed. With a larger pixel size, images are under sampled and the image quality is adversely affected. Generally, the smaller the pixel size, the clearer the image.

Image collecting devices that incorporate infrared focal planes, for example, those used in spacecraft and other air vehicles, tend to suffer from a low number of pixels and a relatively large pixel size, simply due to the current state of the art of fabricating infrared focal planes. In other words, the technology is not available, or is prohibitively expensive, to fabricate an infrared focal plane that incorporates a large number of pixels. Generally, for a high frame rate, image recording device that operates in the long wave infrared range, the current state of the art is in the range of about 500 by 500 pixels, with a pixel size in the range of about fifteen to about forty microns.

There remains an unfulfilled need to increase image resolution in a long wave infrared system in order to discern between targets that are close together. Such targets are sometimes referred to as closely spaced objects (CSOs). Prior attempts to increase such image resolution have included incorporation of larger apertures and smaller focal planes. However, incorporation of such solutions is limited by the current state of the art in this technology area and therefore ignores spatial sampling issues. One result is an array that is mapped with pixels that are as large as possible, into an equal sized array, thus achieving no-better (or worse) spatial resolution than just the focal plane of a focal plane array. Smaller focal planes, which include the incorporation of smaller pixels, have corresponding smaller fields of view, which may be a tactical disadvantage. In any event, reduction in pixel size is limited by the state of art of manufacturing, and same-sized arrays that incorporate smaller pixels require processing capability that is proportional to the number of pixels within an area.

Other attempts to increase image resolution include statistical image post-processing techniques as well as other image-processing techniques. Statistical post processing ignores the possibility of a priori knowledge of camera position and "guesses" the position statistically, inducing extra noise into the process. Statistical image post-processing does not take advantage of any knowledge of motion and there is no capability to take quick snapshots that avoid blurring, due to motion or atmosphere. Furthermore, data with low signal-to-background ratios is generally not usable. In summary, existing solutions cannot maximize spatial resolution and signal to noise ratio, or do not get the best performance possible out of the focal plane/camera system.

BRIEF SUMMARY OF THE DISCLOSURE

In one aspect, a method for increasing resolution of a focal plane array having a plurality of pixels dispersed across a total pixel area is provided. The method includes providing an active pixel area for the focal plane array that is less than the physical pixel area, acquiring image data utilizing the reduced active pixel area, and storing the image data in a portion of a memory, the memory having a capacity corresponding to the total pixel area of the focal plane array.

In another aspect, a system for acquiring and storing images is provided. The system includes a focal plane array comprising a plurality of pixels, at least one of the pixels configured to have a reduced effective area, a processing device configured to receive data from the focal plane array, and a memory communicatively coupled to the processing device. The memory has a capacity that corresponds to the total pixel area of the focal plane array.

In still another aspect, a method for improving the quality of images acquired at a focal plane on a moving platform having inertial motion sensors is provided. The method includes reducing an effective area of a plurality of pixels associated with the focal plane, acquiring a plurality of images that are correlated by a position of the focal plane at the time of acquisition, as determined by the inertial motion sensors, utilizing the effective area of the pixels, and combining the plurality of images into a combined image based on the position correlations, the combined image having a higher resolution based on an increased sample size.

The features, functions, and advantages that have been discussed can be achieved independently in various embodiments of the present invention or may be combined in yet other embodiments further details of which can be seen with reference to the following description and drawings.

DETAILED DESCRIPTION OF THE DISCLOSURE

Figure 1:
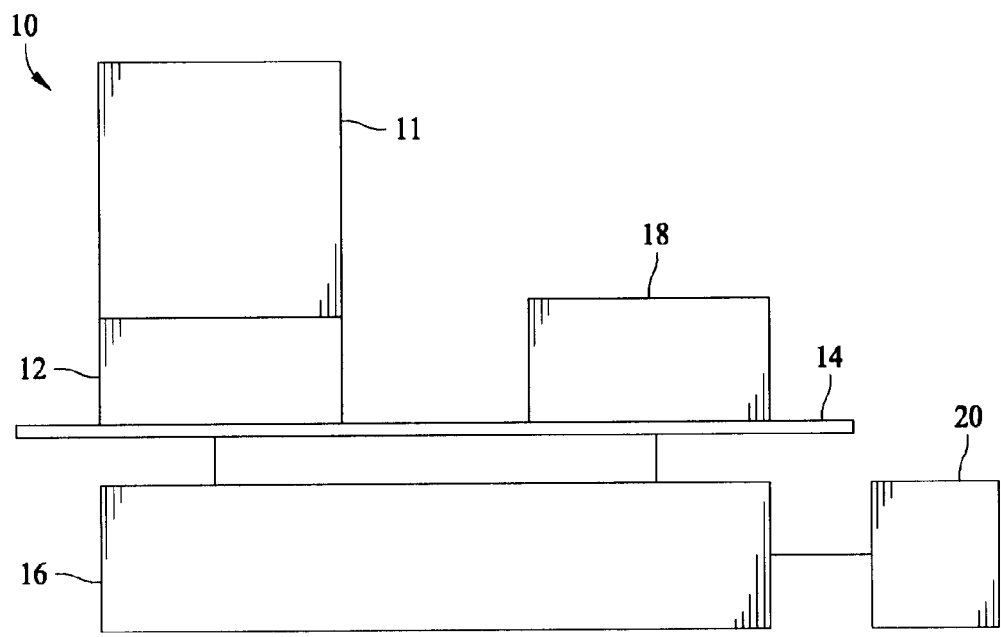
FIG. 1 is a schematic representation of a motion compensated integration system according to an embodiment of the disclosure.

FIG. 1 is a diagram illustrating one embodiment of a motion compensated integration system 10 that includes an optical sensor using a camera 11 having a focal plane array ("FPA") 12 fixedly mounted to a moving platform 14. In various embodiments, the moving platform 14 is one of an interceptor missile that operates in outer space, a satellite, a space vehicle, an air vehicle, an aircraft, a ground vehicle, and watercraft.

Data received by FPA 12 is directed to a motion compensated integration ("MCI") processor 16. Also mounted on the moving platform 14 is an inertial measurement unit ("IMU") 18, which sends optical sensor line-of-sight movement data from a triad of gyroscopes (not shown) to the MCI processor 16. Due to the camera 11 and FPA 12 being fixedly mounted to the moving platform 14, the illustrated embodiment does not include position compensating devices, such as scan mirrors, gimbals, and position pickoffs, but rather uses data from the IMU 18 to compensate for the movement of the platform 14. Other embodiments may use an optical sensor line-of-sight measuring device (not shown) capable of producing the optical sensor line-of-sight movement data. The optical sensor line-of-sight measuring device may incorporate an inertial measurement unit.

Other embodiments include the camera 11 itself functioning as the moving platform or the FPA 12 moveably mounted to the moving platform 14 such that the orientation of the FPA 12 relative to the moving platform may change prior to scanning. Such embodiments result in the line-of-sight of the optical sensor being changeable relative to the platform 14. The FPA 12 is fixedly positioned to the moving platform 14 once scanning begins.

The motion of camera 11 is recorded by inertial motion sensors of the IMU 18, and correlated with each frame. Then, as each frame is recorded, it is copied into memory 20 where it may be accessed by processes that utilize the signal, for example, determining an array response, and for removing fixed pattern noise. The noise and response functions of the array are used to correct responses and remove fixed patterns, and the inertial motion sensor information is used to re-register (stabilize) the minor frame images which may also be stored in memory 20.

As further described herein, one embodiment of system 10 includes a focal plane having a pixel size substantially smaller than the corresponding pixel spacing, which is sometimes referred to herein as sparseness, while another embodiment incorporates a focal plane on which pixel size may be controlled. More specifically, a focal plane takes multiple images of a scene, while the camera moves. The focal plane is either sparse, or it incorporates a mechanism to render it temporarily sparse, so that the image is sampled at a higher resolution than normal for the array. A "master frame" storage buffer is used to record the re-registered and corrected (sparse) "minor frame" images into a dense, higher resolution "master frame" output. In one embodiment, for low signal scenes, the array reverts to its normal state, and for high signal scenes, where high spatial resolution is required, the array is made sparse. As further described herein, techniques for providing a sparse focal plane include one or more of utilization of a physical mask; incorporation of drain "channels" around the array pixels to decrease pixel active area, and in some systems, sampling a fraction of the array; or using an array with a programmable pixels configuration. These techniques include physical embodiments that can accomplish sparse sampling, while still minimizing processing.

Figure 2:
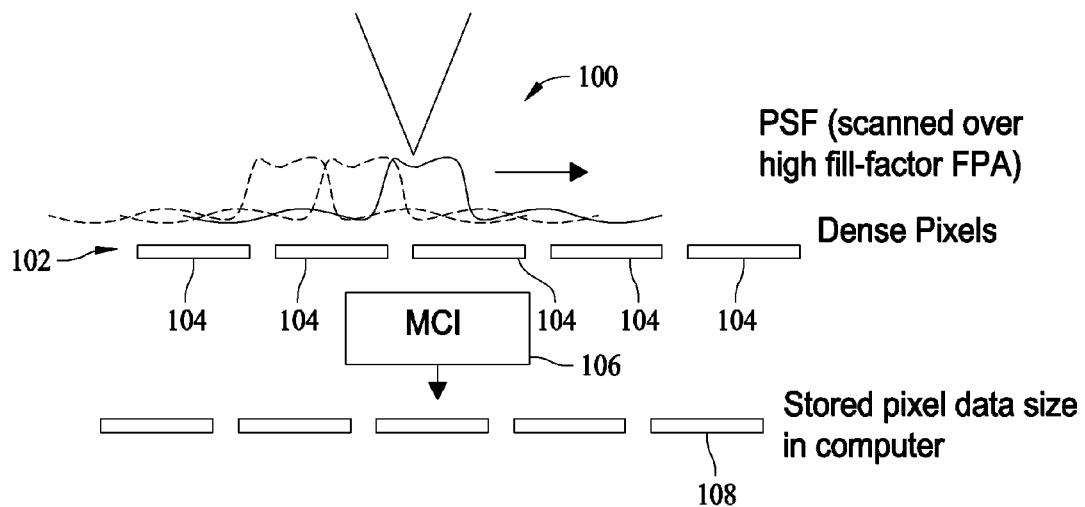
FIG. 2 is a functional diagram illustrating motion compensated integration.

FIG. 2 is a functional diagram illustrating motion compensated integration. Specifically, light converging from a lens onto a focal plane (represented by the V) results in a point spread function 100 when sensed by a pixel array. The point spread function 100 represents mapping relating to a point of light in object space to a function in image space (the dashed lines represent the function 100 over time). The converged light is scanned by a high fill-factor focal plane array 102 made up of normally sized and spaced pixels 104. The data received from the pixels 104 is processed through a motion compensated integration function 106 and stored in the memory 108 of a computer where the size of stored data is at least partially based on an active area of the individual pixels 104.

Figure 3:
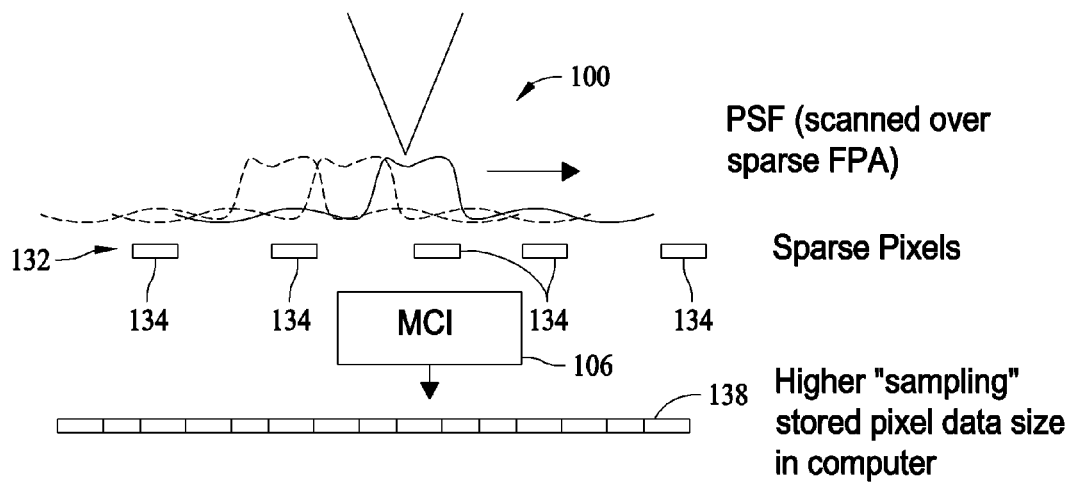
FIG. 3 illustrates a point spread function being scanned by a focal plane array configured with pixels configured to operate with a reduced effective area.

FIG. 3 illustrates the same point spread function 100 is scanned by an array 132 of the same pixel pitch, but made up of sparse pixels 134, implemented utilizing one of the methods for reducing effective pixel area mentioned above. The data received from the pixels 134 is processed through the same motion compensated integration function 106 and stored in the memory 138 of a computer. Due to the reduced effective area of pixels 134, as compared to pixels 104, more samples can be taken, and the same amount of memory 138 can be utilized to store each of the minor-frame samples.

Figure 4:
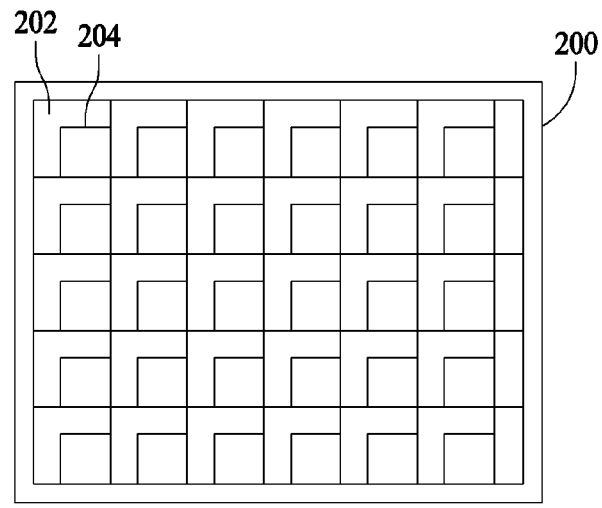
FIG. 4 is a diagram of a focal plane array having a number of pixels, each including a physical mask.
Figure 5:
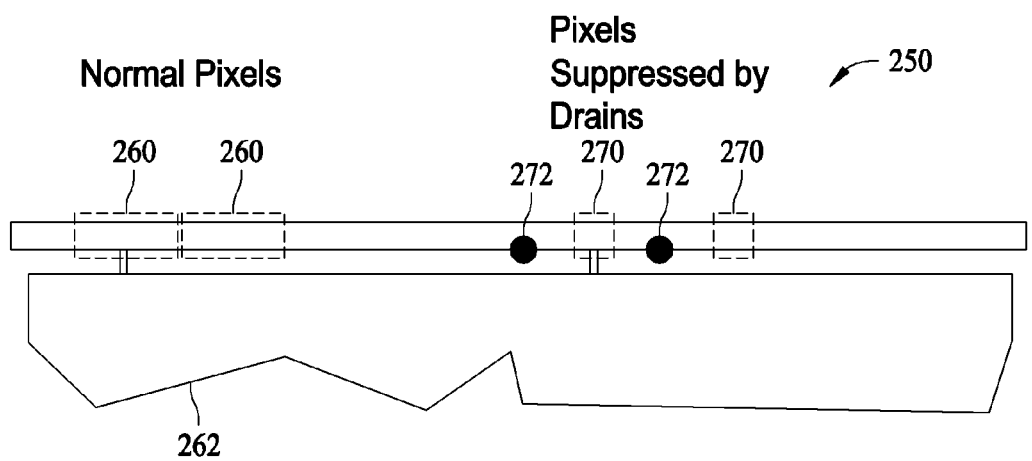
FIG. 5 is a diagram of a focal plane array having a number of pixels, each having a reduced effective area through the incorporation of electrical drain channels around the pixels.
Figure 6:
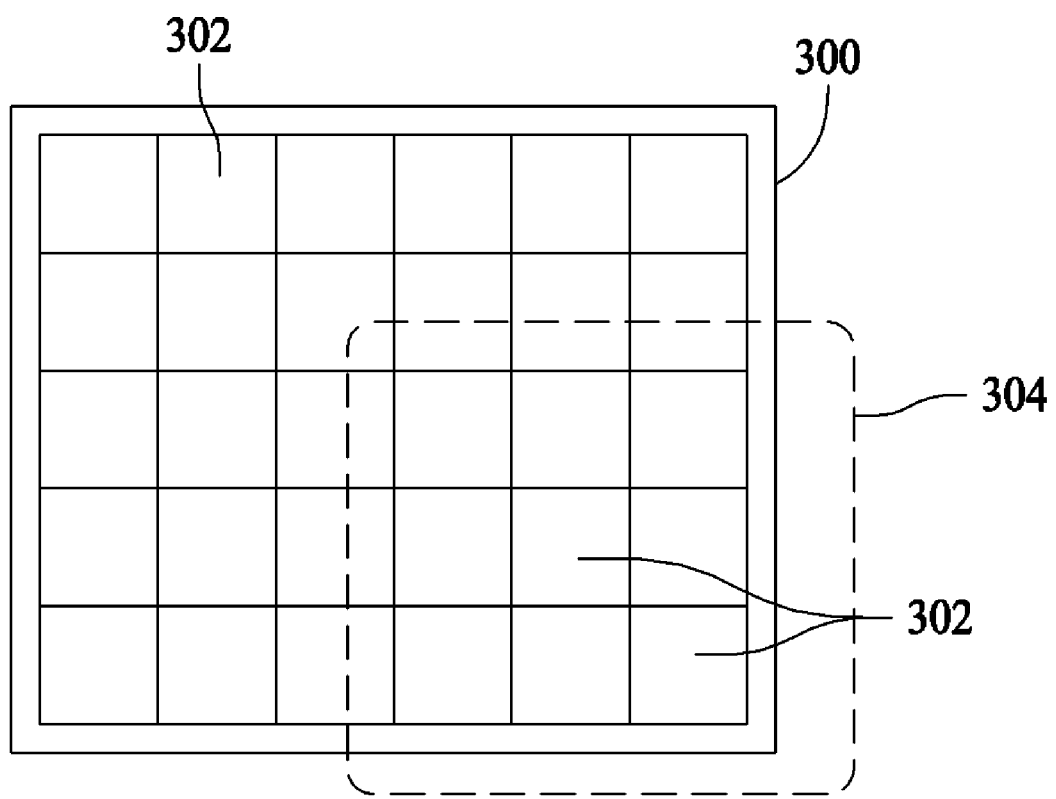
FIG. 6 is a diagram of a focal plane array having a number of pixels, an effective area of the array reduced through incorporation of programmable pixels.

FIGS. 4-6 illustrate the above-mentioned mechanisms for implementation of sparse (reduced effective area) pixels within a focal plane array. Specifically referring to FIG. 4, a focal plane array 200 incorporates a number of pixels 202. Each of the pixels 202 includes a physical mask placed thereon which effectively reduces the operating area of each pixel 202. In the illustrated embodiment, the physical mask includes an aperture 204 therethrough. The effect of such an implementation is that an increased number of minor-frame samples may be taken without requiring a corresponding increase in memory to store the scan data received via the pixels. The effect of masks 204 is to maximize spatial resolution at the cost of signal to noise ratio for the pixels 202.

FIG. 5 is an illustration (side functional view) of a focal plane array 250 comparing pixels 260 operating as intended with respect to a substrate 262. As also illustrated by FIG. 5, an effective area of pixels 270 is reduced, as compared to pixels 260, through the incorporation of electrical drain channels 272 around the pixels 260 of the array 250 to decrease pixel active area. Specifically, drains 272 are added in the fabrication process for array 250 and electrically operable to reduce the effective area of pixels 270, providing the same results as the masking process described with respect to FIG. 4. In one embodiment, the drains 272 are a grid of wires built into the focal plane structure. By grounding these wires (drains 272), a portion of the electric field associated with individual pixel 270 is nullified, resulting in a smaller effective pixel. When the grounding is removed, the pixels of the focal plane array 250 operate normally (at full size (e.g., pixels 260)), with a increased signal-to-noise ratio.

FIG. 6 is an illustration of a focal plane array 300 incorporates a number of pixels 302. In this embodiment each of, or groups of, the pixels are programmable. In the illustrated embodiment, either all of the pixels 302 within the array 300 are active or only those pixels 302 within a sampling area 304. In one embodiment, the configuration is based on an array 300 that incorporated a programmable pixels configuration. Such operation allows for sampling only a fraction of the pixels 302 within the array 300. The effect of such an implementation, as is common with the implementations described above, is that an increased number of samples may be taken without requiring a corresponding increase in memory to store the scan data received via the pixels 302.

Figure 7:
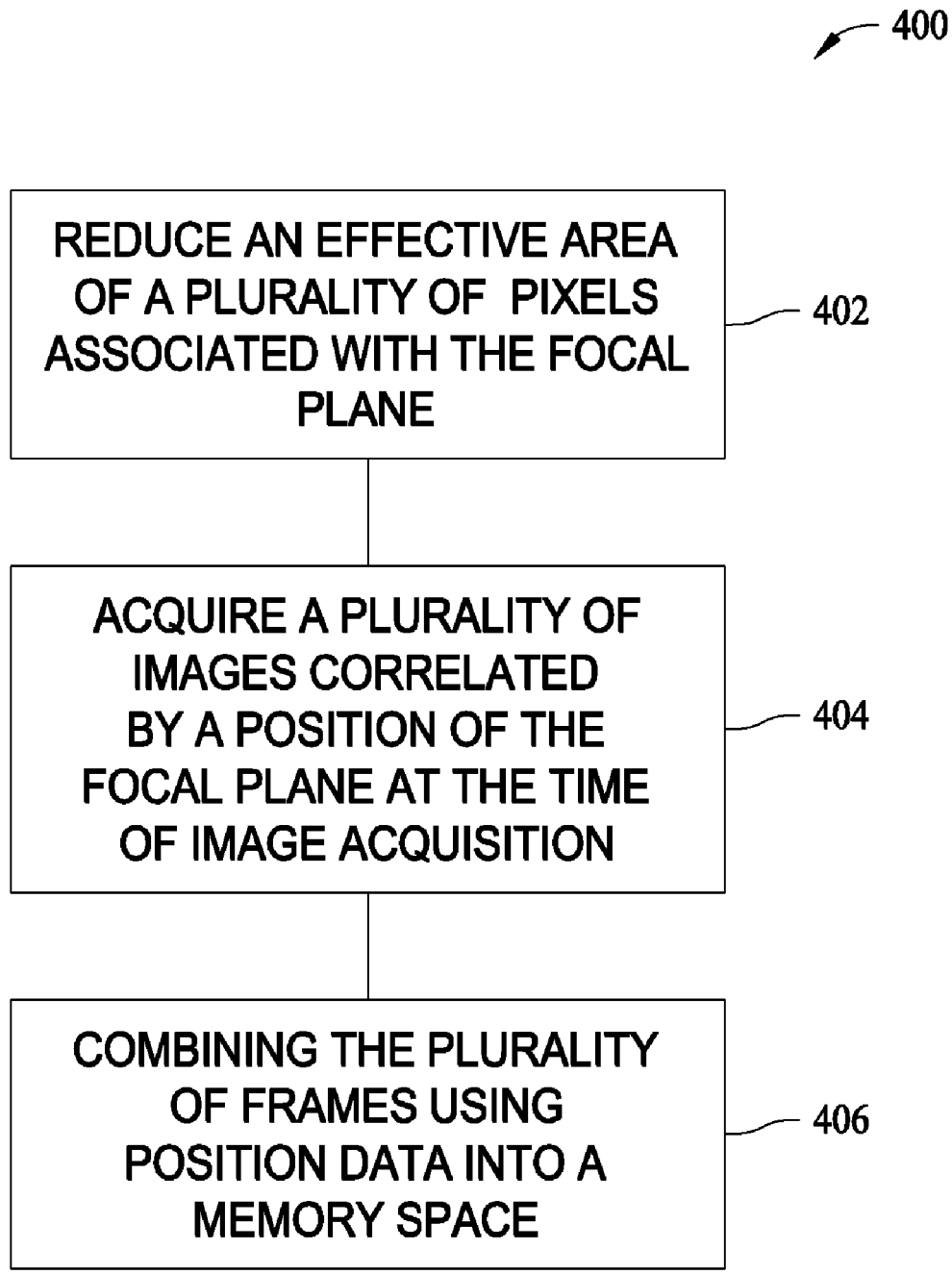
FIG. 7 is a flowchart that illustrates a method for increasing resolution of a focal plane array having a plurality of pixels dispersed across a total pixel area.

The above described embodiments provide a mechanism for several image processing methods, a first of which is illustrated by FIG. 7, which is a flowchart 400 that illustrates a method for increasing resolution of a focal plane array having a plurality of pixels dispersed across a total pixel area thereby improving the quality of images acquired at a focal plane on a moving platform having inertial motion sensors. The method includes reducing 402 an effective area of a plurality of pixels associated with the focal plane, acquiring 404 a plurality of images, at different times, utilizing the effective area of the pixels, the images correlated by a position of the focal plane at the time of acquisition, as determined by the inertial motion sensors, utilizing the effective area of the pixels, and combining 408 the first and second images into a combined image based on a position of the moving platform when each image was acquired, as determined by the inertial motion sensors, the combined image having a higher resolution based on an increased sample size.

Systems that incorporate motion compensated integration operate by moving the focal plane and averaging the received data to provide images improved in resolution. When such functionality is combined with the sparse sampling methods described herein, that is, making the pixels appear to be smaller and widely spaced instead of big and closely spaced, an image can be produced that has a resolution comparable to an image that was sampled using by a densely packed array of small pixels. Such an image is generally the result of combining several or many recorded instantaneous, or minor, frames into a summed, or major, frame.

The data associated with this type of image requires a memory that is consistent with the size of the virtual focal plane created by the reduction in effective pixel size. Specifically, a memory that stores a combined image is finer than a focal plane pixel count, in order to sample the higher resolution information. For example, for 250,000 pixels, a 1,000,000 space memory is needed. Such a configuration results in four memory bins for each physical pixel, doubling the resolution.

The above described embodiments utilize a camera or other image gathering device having a focal plane array and optics and configured to use motion compensated integration to greatly improve image resolution, particularly the resolution of closely spaced point sources. In embodiments where a focal plane array with controllable pixel size is utilized, the camera may have high sensitivity to low signals in one mode, and very high spatial resolution in another mode. Therefore, performance of a focal plane array used with motion compensated integration is enhanced by adding a variable pixel size capability to the focal plane and an over-sampled image (re-registration) memory, to produce much higher spatial resolution than ordinary motion compensated integration.

This written description uses examples to disclose the invention, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for increasing resolution of a focal plane array having a plurality of pixels dispersed across a total pixel area, said method comprising:
   providing a reduced active pixel area for the focal plane array that is less than the total pixel area by effectively reducing an operating area associated with at least one pixel of the focal plane array when a signal to noise ratio at the focal plane is at a predefined threshold;
   acquiring image data utilizing the reduced active pixel area;
   storing the image data in a first portion of a memory, the memory having a capacity corresponding to the total pixel area of the focal plane array;
   storing subsequently acquired image data, also acquired utilizing the reduced active pixel area, in other portions of the memory, the other portions of the memory corresponding to a non-active pixel area of the total pixel area; and
   combining the image data from the memory portions into a single, increased resolution image.

2. A method according to claim 1 further comprising repeating the acquiring and storing steps until the utilized memory portions are substantially equal to the memory capacity.

3. A method according to claim 1 wherein providing an active pixel area for the focal plane array that is less than the total pixel area comprises incorporating a physical mask to effectively reduce an operating area associated with at least one pixel of the focal plane array.

4. A method according to claim 3 wherein incorporating a physical mask to effectively reduce an operating area comprises incorporating a physical mask that includes at least one aperture therethrough to define the reduced effective area.

5. A method according to claim 1 wherein providing an active pixel area for the focal plane array that is less than the total pixel area comprises reducing an effective area of at least one pixel of the focal plane array through incorporation of an electrical drain channel around the at least one pixel.

6. A method according to claim 5 wherein the electrical drain channel includes a wire around the at least one pixel that can be grounded to nullify a portion of an electrical field associated with the at least one pixel.

7. A method according to claim 1 wherein providing an active pixel area for the focal plane array that is less than the total pixel area comprises providing a programmable pixel configuration such that only a fraction of the pixels within the focal plane array are sampling an object.

8. A system for acquiring and storing images, said system comprising:
   a focal plane array comprising a plurality of pixels, said focal plane array configured to have a reduced effective area and a non-effective area in combination defining a total pixel area, wherein the effective pixel area is reduced when a signal to noise ratio at the focal plane array is at a predefined threshold;
   a processing device configured to receive data from said focal plane array; and
   a memory communicatively coupled to said processing device, said memory having a capacity corresponding to the total pixel area of said focal plane array, and wherein a portion of said memory is utilized to store image data corresponding to non-effective areas of said focal plane array, the memory portion configured to store additional image samples taken utilizing the reduced effective area of said focal plane array.

9. A system according to claim 8 wherein said focal plane array comprises a physical mask placed to define the reduced effective area and the non-effective area associated with said plurality of pixels.

10. A system according to claim 9 wherein said physical mask comprises at least one aperture therethrough to define the reduced effective area associated with said plurality of pixels.

11. A system according to claim 8 wherein said focal plane array comprises an electrical drain channel around at least a portion of said pixels, said electrical drain channel operable to reduce the effective area of said focal plane array.

12. A system according to claim 11 wherein said electrical drain channel comprises a wire around at least one of said pixels, said electrical drain channel operable to be grounded, the operation of grounding nullifying a portion of an electrical field associated with at least one of said pixels.

13. A system according to claim 8 wherein said focal plane array comprises providing a programmable pixel configuration operable such that only a subset of said plurality of pixels within said focal plane array will sample an object.

14. A method for improving the quality of images acquired at a focal plane on a moving platform having inertial motion sensors, said method comprising:
   reducing an effective area of a plurality of pixels associated with the focal plane when the signal to noise ratio at the focal plane is at a predefined threshold to define a reduced effective area and a non-effective area;
   acquiring and storing a plurality of images that are correlated by a position of the focal plane at the time of acquisition, as determined by the inertial motion sensors, utilizing the reduced effective area of the pixels, a portion of the plurality of images stored in a memory allocated to the non-effective area of the pixels; and
   combining the plurality of images into a combined image based on the position correlations, the combined image having a higher resolution based on an increased sample size.

15. A method according to claim 14 wherein reducing an effective area of a plurality of pixels comprises utilizing a physical mask to define the reduced effective area and the non-effective area of one or more pixels associated with the focal plane.

16. A method according to claim 14 wherein reducing an effective area of a plurality of pixels comprises incorporating drain channels around a plurality of pixels associated with the focal plane to decrease the active area of those pixels.

17. A method according to claim 14 wherein reducing an effective area of a plurality of pixels comprises programming a pixel configuration such that only a portion of the pixels within the focal plane are active.

18. A method according to claim 14 wherein combining the plurality of images comprises correlating the plurality of images using position data from the inertial motion sensors to correct for noise and fixed pattern noise.

* * * * *